(12) United States Patent
Marker et al.

(10) Patent No.: US 7,982,079 B2
(45) Date of Patent: *Jul. 19, 2011

(54) INTEGRATED PROCESS FOR PRODUCTION OF DIESEL FUEL FROM RENEWABLE FEEDSTOCKS AND ETHANOL DENATURIZING

(75) Inventors: Terry L. Marker, Palos Heights, IL (US); Graham D. Ellis, Guildford (GB); Christopher D. Gosling, Roselle, IL (US)

(73) Assignee: UOP LLC, Des Plaines, IL (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/208,390

(22) Filed: Sep. 11, 2008

(65) Prior Publication Data

US 2010/0058648 A1 Mar. 11, 2010

(51) Int. Cl.
*C07C 4/00* (2006.01)
(52) U.S. Cl. .................... 585/240; 585/242; 585/14
(58) Field of Classification Search .................. 585/240, 585/242, 740, 750, 14; 44/53, 56
See application file for complete search history.

(56) References Cited

U.S. PATENT DOCUMENTS

| | | | | |
|---|---|---|---|---|
| 4,425,137 A | * | 1/1984 | Roth | 44/453 |
| 4,568,356 A | * | 2/1986 | Chambers | 44/453 |
| 4,678,860 A | * | 7/1987 | Kuester | 585/14 |
| 4,992,605 A | * | 2/1991 | Craig et al. | 585/240 |
| 5,093,535 A | * | 3/1992 | Harrison et al. | 568/881 |
| 5,186,722 A | * | 2/1993 | Cantrell et al. | 44/605 |
| 5,705,722 A | | 1/1998 | Monnier et al. | |
| 5,710,030 A | * | 1/1998 | Anderson | 435/134 |
| 5,882,505 A | * | 3/1999 | Wittenbrink et al. | 208/59 |
| 6,630,066 B2 | * | 10/2003 | Cash et al. | 208/58 |
| 6,846,402 B2 | * | 1/2005 | Hemighaus et al. | 208/14 |
| 7,232,935 B2 | * | 6/2007 | Jakkula et al. | 585/240 |
| 7,279,018 B2 | | 10/2007 | Jakkula et al. | |
| 7,288,278 B2 | * | 10/2007 | Mellerup et al. | 426/606 |
| 7,326,285 B2 | * | 2/2008 | Chowdhury | 96/243 |
| 7,425,657 B1 | | 9/2008 | Elliott et al. | |
| 7,459,597 B2 | * | 12/2008 | Koivusalmi et al. | 585/733 |
| 7,491,858 B2 | | 2/2009 | Murzin et al. | |
| 7,501,546 B2 | * | 3/2009 | Koivusalmi et al. | 585/327 |
| 7,540,952 B2 | | 6/2009 | Pinho et al. | |
| 7,718,051 B2 | * | 5/2010 | Ginosar et al. | 208/113 |
| 7,816,570 B2 | * | 10/2010 | Roberts et al. | 585/240 |
| 7,838,272 B2 | * | 11/2010 | Miller | 435/167 |
| 2006/0186020 A1 | | 8/2006 | Gomes | |
| 2006/0207166 A1 | | 9/2006 | Herskowitz et al. | |

(Continued)

FOREIGN PATENT DOCUMENTS

CN 11270300 A 9/2008

(Continued)

*Primary Examiner* — N. Bhat
(74) *Attorney, Agent, or Firm* — Maryann Maas

(57) ABSTRACT

An integrated process has been developed for producing diesel boiling range fuel from renewable feedstocks such as plant and animal fats and oils and using a byproduct naphtha as a denaturant for ethanol. The process involves treating a renewable feedstock by hydrogenating and deoxygenating i.e. decarboxylating, decarbonylating, and/or hydrodeoxygenating to provide a hydrocarbon fraction useful as a diesel fuel or diesel boiling range fuel blending component. If desired, the hydrocarbon fraction can be isomerized to improve cold flow properties. A byproduct naphtha stream from the diesel boiling range fuel production process is used as the denaturant in an alcohol denaturing process for the generation of denaturized ethanol.

20 Claims, 2 Drawing Sheets

U.S. PATENT DOCUMENTS

| | | | |
|---|---|---|---|
| 2007/0006523 A1 | 1/2007 | Myllyoja et al. |
| 2007/0010682 A1 | 1/2007 | Myllyoja et al. |
| 2007/0068848 A1 | 3/2007 | Monnier et al. |
| 2007/0131579 A1 | 6/2007 | Koivusalmi et al. |
| 2007/0135316 A1 | 6/2007 | Koivusalmi et al. |
| 2007/0135663 A1 | 6/2007 | Aalto et al. |
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1 | 11/2007 | Duarte Santiago et al. |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Ferreira Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077866 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0259082 A1* | 10/2009 | Deluga et al. ............... 585/14 |

FOREIGN PATENT DOCUMENTS

| | | |
|---|---|---|
| CN | 11343552 A | 1/2009 |
| EP | 1719811 A1 | 8/2006 |
| EP | 2046917 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007064015 A1 | 6/2007 |
| WO | 2007075632 A2 | 7/2007 |
| WO | WO 2007/075632 A2 | 7/2007 |
| WO | 2007125332 A1 | 11/2007 |
| WO | WO 2007/125332 A1 | 11/2007 |
| WO | 2007141293 A1 | 12/2007 |
| WO | 2007142013 A1 | 12/2007 |
| WO | WO 2007/141293 A1 | 12/2007 |
| WO | WO 2007/142013 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

* cited by examiner

INTEGRATED PROCESS FOR PRODUCTION OF DIESEL FUEL FROM RENEWABLE FEEDSTOCKS AND ETHANOL DENATURIZING

FIELD OF THE INVENTION

This invention relates to an integrated process for producing hydrocarbons useful as diesel boiling range fuel from renewable feedstocks such as the glycerides and free fatty acids found in materials such as plant oils, fish oils, animal fats, and greases, and a process for denaturizing ethanol. The diesel boiling range fuel production portion of the process involves hydrogenation, decarboxylation and/or hydrodeoxygenation and optional isomerization in one or more reactors. Naphtha is separated from the hydrocarbon product of the diesel boiling range fuel production process and is used as a denaturant for ethanol.

BACKGROUND OF THE INVENTION

As the demand for diesel boiling range fuel increases worldwide there is increasing interest in sources other than petroleum crude oil for producing diesel boiling range fuel. One such renewable source is what has been termed renewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these classes of compounds contain aliphatic carbon chains having from about 8 to about 24 carbon atoms. Most of the aliphatic chains in the glycerides or FFAs can be fully saturated, or mono, di or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which integrates an alcohol denaturing process with the generation of diesel boiling range fuel, or fuel blending component from a renewable feedstock. The diesel boiling range fuel production process comprises one or more steps to hydrogenate, decarboxylate, decarbonylate (and/or hydrodeoxygenate) and optionally isomerize the renewable feedstock. Naphtha is separated from the hydrocarbon product of the reaction zones. At least a portion of the naphtha is used as an alcohol denaturant.

SUMMARY OF THE INVENTION

An integrated process to denature alcohol and to produce a paraffin-rich diesel boiling range product from the renewable feedstock wherein the process comprises treating the renewable feedstock in a reaction zone by hydrogenating and deoxygenating the feedstock at reaction conditions to provide a first reaction product comprising a hydrocarbon fraction comprising paraffins, separating a naphtha fraction from the hydrocarbon fraction and utilizing the separated naphtha fraction as a denaturant for alcohol such as ethanol.

BRIEF DESCRIPTION OF THE DRAWINGS

FIG. 1 is a more simplistic schematic, while FIG. 2 is more detailed.

DETAILED DESCRIPTION OF THE INVENTION

Figure 1:
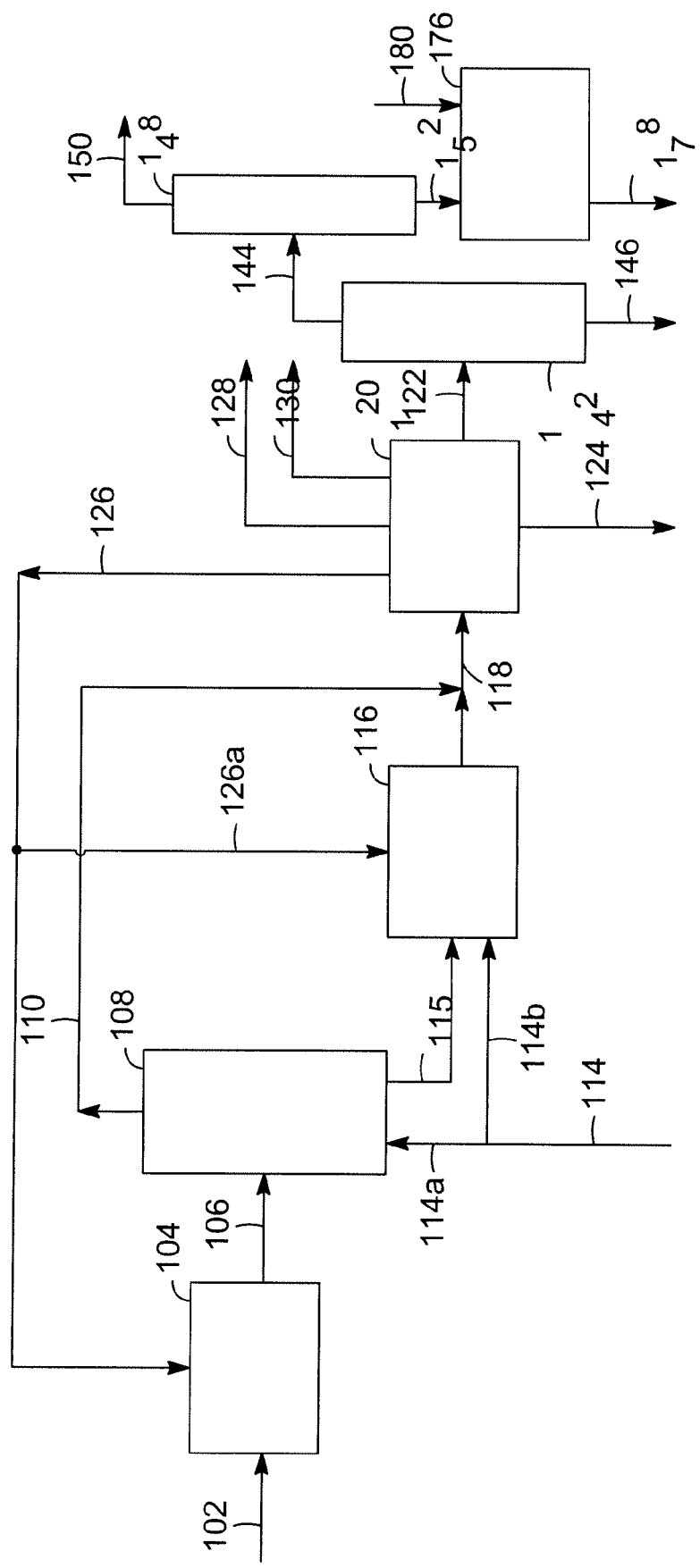
FIG. 1 and FIG. 2 are schematics of one embodiment of the invention.

As stated, the present invention integrates a process for producing a hydrocarbon stream useful at least as diesel boiling range fuel or fuel blending component from renewable feedstocks such as renewable feedstocks originating from plants or animals and a process for preparing such feedstocks from their source materials. The term renewable feedstock is meant to include feedstocks other than those obtained from petroleum crude oil. Another term that has been used to describe this class of feedstock is biorenewable fats and oils. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, tallow, yellow and brown greases, lard, train oil, fats in milk, fish oil, algal oil, sewage sludge, and the like. Additional examples of renewable feedstocks include non-edible vegetable oils from the group comprising Jatropha curcas (Ratanjoy, Wild Castor, Jangli Erandi), Madhuca indica (Mohuwa), Pongamia pinnata (Karanji Honge), and Azadiracta indicia (Neem). The triglycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and petroleum derived hydrocarbons may also be used as the feedstock. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a petroleum based or other process into a valuable co-feed component to the current process.

The integration of the alcohol denaturing process and the diesel boiling range fuel generation process centers around the need for an alcohol denaturant to be used in the denaturing process and the byproduct naphtha produced in the diesel fuel generation process. Many different denaturing agents have been used to denature ethanol, and the agent is often selected based upon the end use of the denatured alcohol. The naphtha generated as a byproduct in the production of diesel boiling range fuel from renewable feedstocks typically contains paraffinic hydrocarbons having boiling points in the range of 30 to 170° C. and having from about 5 to about 7 carbon atoms. The naphtha stream may be used as all or part of the denaturing agent in the alcohol denaturing process. In this way, a byproduct in one process becomes the source of an otherwise expensive agent in another process.

Turning to the diesel boiling range fuel generation portion of the integrated process, renewable feedstocks that can be used as the feedstock to the diesel boiling range fuel generation process may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. The conditions at which the reactor is operated are well known in the art.

Another possible means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. application Ser. No. 11/770,826, hereby incorporated by reference, is another pretreatment technique which may be employed.

The renewable feedstock is flowed to a first reaction zone comprising one or more catalyst beds in one or more reactors. The term "feedstock" is meant to include feedstocks that have not been treated to remove contaminants as well as those feedstocks purified in a pretreatment zone. In the reaction first zone, the feedstock is contacted with a hydrogenation or hydrotreating catalyst in the presence of hydrogen at hydrogenation conditions to hydrogenate the olefinic or unsaturated portions of the aliphatic side chains of the glyceride molecules. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation or hydrotreating catalysts enumerated above are also capable of catalyzing decarboxylation and/or hydrodeoxygenation of the feedstock to remove oxygen. Decarboxylation, decarbonylation, and hydrodeoxygenation are herein collectively referred to as deoxygenation reactions. Decarboxylation conditions include a relatively low pressure of about 3447 kPa (500 psia) to about 6895 kPa (1000 psia), a temperature of about 200° C. to about 400° C. and a liquid hourly space velocity of about 0.5 to about 10 $hr^{-1}$. In another embodiment the decarboxylation conditions include the same relatively low pressure of about 3447 kPa (500 psia) to about 6895 kPa (1000 psia), a temperature of about 288° C. to about 345° C. and a liquid hourly space velocity of about 1 to about 4 $hr^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all of the reactions occur simultaneously in one reactor or in one bed. Alternatively, the conditions can be controlled such that hydrogenation primarily occurs in one bed and decarboxylation and/or hydrodeoxygenation occurs in a second bed. Of course if only one bed is used, then hydrogenation may occur primarily at the front of the bed, while deoxygenation occurs mainly in the middle and bottom of the bed. Finally, desired hydrogenation can be carried out in one reactor, while deoxygenation can be carried out in a separate reactor.

The reaction product from the hydrogenation and deoxygenation reactions will comprise a liquid portion and a gaseous portion. The liquid portion comprises a hydrocarbon fraction which is essentially all n-paraffins and having a large concentration of paraffins in the range of about 9 to about 18 carbon atoms. Different feedstocks will result in different distributions of paraffins. The gaseous portion comprises hydrogen, carbon dioxide, carbon monoxide, water vapor, propane and perhaps sulfur components such as hydrogen sulfide or phosphorous component such as phosphine.

In one embodiment, the effluent from the deoxygenation reactor is conducted to an optional hot high pressure hydrogen stripper. One purpose of the hot high pressure hydrogen stripper is to separate the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the effluent may result in poor catalyst performance in the isomerization zone. Water, carbon monoxide, carbon dioxide, any ammonia or hydrogen sulfide are selectively stripped in the hot high pressure hydrogen stripper using hydrogen. The temperature may be controlled in a limited range to achieve the desired separation and the pressure may be maintain at approximately the same pressure as the two reaction zones to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C.

The effluent enters the optional hot high pressure stripper and the gaseous components, are carried with the hydrogen stripping gas and separated into an overhead stream. Additional hydrogen is used as the stripping gas. The remainder of the deoxygenation effluent stream is removed as hot high pressure hydrogen stripper bottoms and contains the liquid hydrocarbon fraction having components such as normal hydrocarbons having from about 8 to about 24 carbon atoms. A portion of this liquid hydrocarbon fraction in hot high pressure hydrogen stripper bottoms may be used as the hydrocarbon recycle described below.

Hydrogen is a reactant in at least some of the reactions above, and to be effective, a sufficient quantity of hydrogen must be in solution to most effectively take part in the catalytic reaction. Past processes have operated at high pressures in order to achieve a desired amount of hydrogen in solution and readily available for reaction. However, higher pressure operations are more costly to build and to operate as compared to their lower pressure counterparts. One advantage of the present invention is the operating pressure may be in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time.

In one embodiment, the desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution. In one embodiment of the invention, the volume ratio of hydrocarbon recycle to feedstock is from about 2:1 to about 8:1 or about 2:1 to about 6:1. In another embodiment the ratio is in the range of about 3:1 to about 6:1 and in yet another embodiment the ratio is in the range of about 4:1 to about 5:1.

Although this hydrocarbon fraction is useful as a diesel boiling range fuel, or fuel blending component, because it comprises essentially n-paraffins, it will have poor cold flow properties. If it is desired to improve the cold flow properties of the liquid hydrocarbon fraction, then the hydrocarbon fraction may be contacted with an isomerization catalyst under isomerization conditions to at least partially isomerize the n-paraffins to branched paraffins. The effluent of the optional second reaction zone, the isomerization zone, is a branched-paraffin-rich stream. By the term "rich" it is meant that the effluent stream has a greater concentration of branched paraffins than the stream entering the isomerization zone, and preferably comprises greater than 50 mass-% branched paraffins. It is envisioned that the isomerization zone effluent may contains 70, 80, or 90 mass-% branched paraffins. Isomerization can be carried out in a separate bed of the same reaction zone, i.e. same reactor, described above or the isomerization can be carried out in a separate reactor. For ease of description the following will address the embodiment where a second reactor is employed for the isomerization reaction. The hydrocarbon stream is contacted with an isomerization catalyst in the presence of hydrogen at isomerization conditions to isomerize the normal paraffins to branched paraffins. Only minimal branching is required, enough to overcome the cold-flow problems of the normal paraffins. Since attempting for significant branching runs the risk of high degree of undesired cracking, the predominant isomerized product is a mono-branched hydrocarbon.

The hydrogen stripped product of the deoxygenation reaction zone is contacted with an isomerization catalyst in the presence of hydrogen at isomerization conditions to isomerize the normal paraffins to branched paraffins. Only minimal branching is required, enough to overcome cold-flow problems of the normal paraffins. Since attempting for significant branching runs the risk of high degree of undesired cracking, the predominant isomerized product is a mono-branched hydrocarbon.

The isomerization of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230085 A1 which is incorporated by reference in its entirety. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled "New Molecular Sieve Process for Lube Dewaxing by Wax Isomerization," written by S. J. Miller, in Microporous Materials 2 (1994) 439-449. The teachings of U.S. Pat. Nos. 4,310,440; 4,440,871; 4,793,984; 4,758,419; 4,943,424; 5,087,347; 5,158,665; 5,208,005; 5,246,566; 5,716,897; and 5,851,949 are hereby incorporated by reference.

U.S. Pat. Nos. 5,444,032 and 5,608,134 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,968,344 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2:Al_2O_3$ ratio is higher than 300: 1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art.

The final effluent stream which is at least the stream obtained after all reactions have been carried out, is now processed through one or more separation steps to obtain a purified hydrocarbon stream useful as a diesel fuel. Note that the final effluent stream may be the product of the deoxygenation reaction zone in the embodiment where the optional isomerization is not preformed, or may be the product of the deoxygenation reaction zone followed by the isomerization zone. The optional hot high pressure hydrogen stripper may or may not be employed after the deoxygenation reaction zone. Therefore the final effluent stream may be the deoxygenation reaction zone product after separation in the hot high pressure hydrogen stripper. In the embodiment utilizing the optional isomerization reaction zone, an optional isomerization effluent separator may be employed to separate and recycle a portion of the hydrogen. In this embodiment, the final effluent stream may be the isomerization reaction zone product after separation on the isomerization effluent separator.

With the final effluent stream comprising both a liquid component and a gaseous component, various portions of which are to be recycled, multiple separation steps may be employed. For example, in the embodiment where the optional isomerization is employed, hydrogen is first separated in a isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a stripping gas and to combine with the remainder as a bottoms stream. The remainder is passed to the isomerization reaction zone and thus the hydrogen becomes a component of the isomerization reaction zone feed streams in order to provide the necessary hydrogen partial pressures for the reactor. The hydrogen is also a reactant in the oxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The final effluent, even after the optional removal of hydrogen, still has liquid and gaseous components and is cooled, by techniques such as air cooling or water cooling and passed to a cold separator where the liquid component is separated from the gaseous component. Suitable operating conditions of the cold separator include, for example, a temperature of about 20 to 60° C. and a pressure of 3850 kPa absolute (560 psia). A water byproduct stream is also separated. At least a portion of the liquid component, after cooling and separating from the gaseous component, may be optionally recycled back to the isomerization zone to increase the degree of isomerization.

The liquid component contains the hydrocarbons useful as diesel fuel as well as smaller amounts of naphtha and LPG. A portion of the separated liquid component may be recovered as diesel fuel or the entire separated liquid component may be further purified in a product stripper which separates lower boiling components and dissolved gases from the diesel product containing $C_8$ to $C_{24}$ normal and branched alkanes. Suitable operating conditions of the product stripper include a temperate of from about 20 to about 200° C. at the overhead and a pressure from about 0 to about 1379 kPa absolute (0 to 200 psia).

The LPG/Naphtha stream is further separated in a debutanizer or depropanizer in order to separate the LPG into an overhead stream, leaving the naphtha in a bottoms stream. Suitable operating conditions of this unit include a temperate of from about 20 to about 200° C. at the overhead and a pressure from about 0 to about 2758 kPa absolute (0 to 400 psia). The LPG may be sold as valuable product or may be used as feed to a hydrogen production facility, or may be blended into the gasoline pool.

The separated naphtha stream generated above, may be used in an alcohol denaturing process as an alcohol denaturant. Alcohols such as ethyl alcohol or ethanol is used as an ingredient in any of a number of products that are not intended for consumption. In some products, ethanol is a solvent in which various compositional components are dissolved. Ethanol is often used in the preparation of cosmetics for its solvent properties, or in the formulation of sanitizing compositions for its antimicrobial properties, for example. Another use of ethanol is as a fuel blending component. Because such products are not intended to be ingested, the ethanol used in such products is typically denatured so that it is rendered undrinkable. Moreover, governmental authorities often impose taxes on commercial shipments of pure ethanol (e.g., 190 or 200 proof) even if the ethanol is intended for industrial uses such an ingredient products not intended for consumption.

A number of materials are available for denaturing ethyl alcohol including methanol, isopropanol, iodine, formaldehyde solution, phenylethyl alcohol, chloroform and diethyl phthalate. Depending upon the use of the alcohol, the present invention provides a naphtha stream suitable for use as an alcohol denaturant. The denatured alcohols can be prepared by mixing the alcohol with at least a portion of the naphtha stream. For example, a portion of the naphtha stream can be added to 190 to 200 proof ethanol to provide a final denaturant concentration of at least about 0.01% by weight. In some embodiments, the concentration of the denaturant may be within the range from about 0.01% to about 20% by total weight. In other embodiments, the final denaturant concentration may fall within the range from about 0.08% to about 1.5% by total weight. The determination of the fitness (or unfitness) of an alcohol denaturant solution may be made according to known methods.

The denatured ethanol can be further used in the preparation of other products that require ethanol and the denaturant as components thereof. These products may comprise from 1 to 99% by weight of the denatured ethanol. In formulating these other products, the denatured alcohol may simply be added to the other components of the product formulation to provide the ethanol and denaturant at concentrations needed for the particular product. Those skilled in the art will appreciate that the concentration of the denaturant in the ethanol composition may be supplemented with additional denaturant to bring the concentration of the denaturant to the level needed for antimicrobial efficacy, for example.

Turning back to the diesel boiling range process, the gaseous component separated in the product separator comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the isomerization zone, but if the carbon dioxide was not removed, its concentration would quickly build up and effect the operation of the isomerization zone. The carbon dioxide can be removed from the hydrogen by means well known in the art such as absorption with an amine, reaction with a hot carbonate solution, pressure swing absorption, etc. If desired, essentially pure carbon dioxide can be recovered by regenerating the spent absorption media.

Similarly, a sulfur containing component such as hydrogen sulfide may be present to maintain the sulfided state of the deoxygenation catalyst or to control the relative amounts of the decarboxylation reaction and the hydrogenation reaction that are both occurring in the deoxygenation zone. The amount of sulfur is generally controlled and so must be removed before the hydrogen is recycled. The sulfur components may be removed using techniques such as adsorption with an amine or by caustic wash. Of course, depending upon the technique used, the carbon dioxide and sulfur containing components, and other components, may be removed in a single separation step such as a hydrogen selective membrane.

The hydrogen remaining after the removal of at least carbon dioxide may be recycled to the reaction zone where hydrogenation primarily occurs and/or to any subsequent beds/reactors. The recycle stream may be introduced to the inlet of the reaction zone and/or to any subsequent beds/reactors. One benefit of the hydrocarbon recycle is to control the temperature rise across the individual beds. However, as discussed above, the amount of hydrocarbon recycle may be determined based upon the desired hydrogen solubility in the reaction zone which is in excess of that used for temperature control. Increasing the hydrogen solubility in the reaction mixture allows for successful operation at lower pressures, and thus reduced cost.

The following embodiment is presented in illustration of this invention and is not intended as an undue limitation on the generally broad scope of the invention as set forth in the claims. First the one embodiment of the process employing the optional isomerization reaction zone is described in general as with reference to FIG. 1. Then the same embodiment of the process is described in more detail with reference to FIG. 2.

Turning to FIG. 1 renewable feedstock 102 enters deoxygenation reaction zone 104 along with recycle hydrogen 126. Deoxygenated product 106 is stripped in hot hydrogen stripper 108 using hydrogen 114a. Carbon oxides and water vapor are removed with hydrogen in overhead 110. Stripped deoxygenated product 115 is passed to isomerization zone 116 along with recycle hydrogen 126a and make-up hydrogen 114b. Isomerized product 118 is combined with overhead 110 and passed to product recovery zone 120. Carbon oxide stream 128, light ends stream 130, water byproduct stream 124, hydrogen stream 126, and branched paraffin-rich product 122 are removed from product recover zone 120. Hydrogen stream 126 is recycled to both the deoxygenation reaction zone 104 and isomerization zone 116. Branched paraffin-rich product 122 is separated in a stripper 142 to remove an LPG and naphtha stream 144 from a diesel fuel product stream 146. The diesel fuel product stream 146 is collected for use as diesel fuel. LPG and naphtha stream 144 is separated in column 148 to generate LPG stream 150 and naphtha stream 152. Naphtha stream 152 is passed to ethanol denaturing unit 176 to add at least a portion of naphtha stream 152 to ethanol introduced in line 180. Denatured ethanol is removed from denaturing unit 176 in line 178. Excess naphtha may be removed from denaturing unit 176 (not shown).

Figure 2:
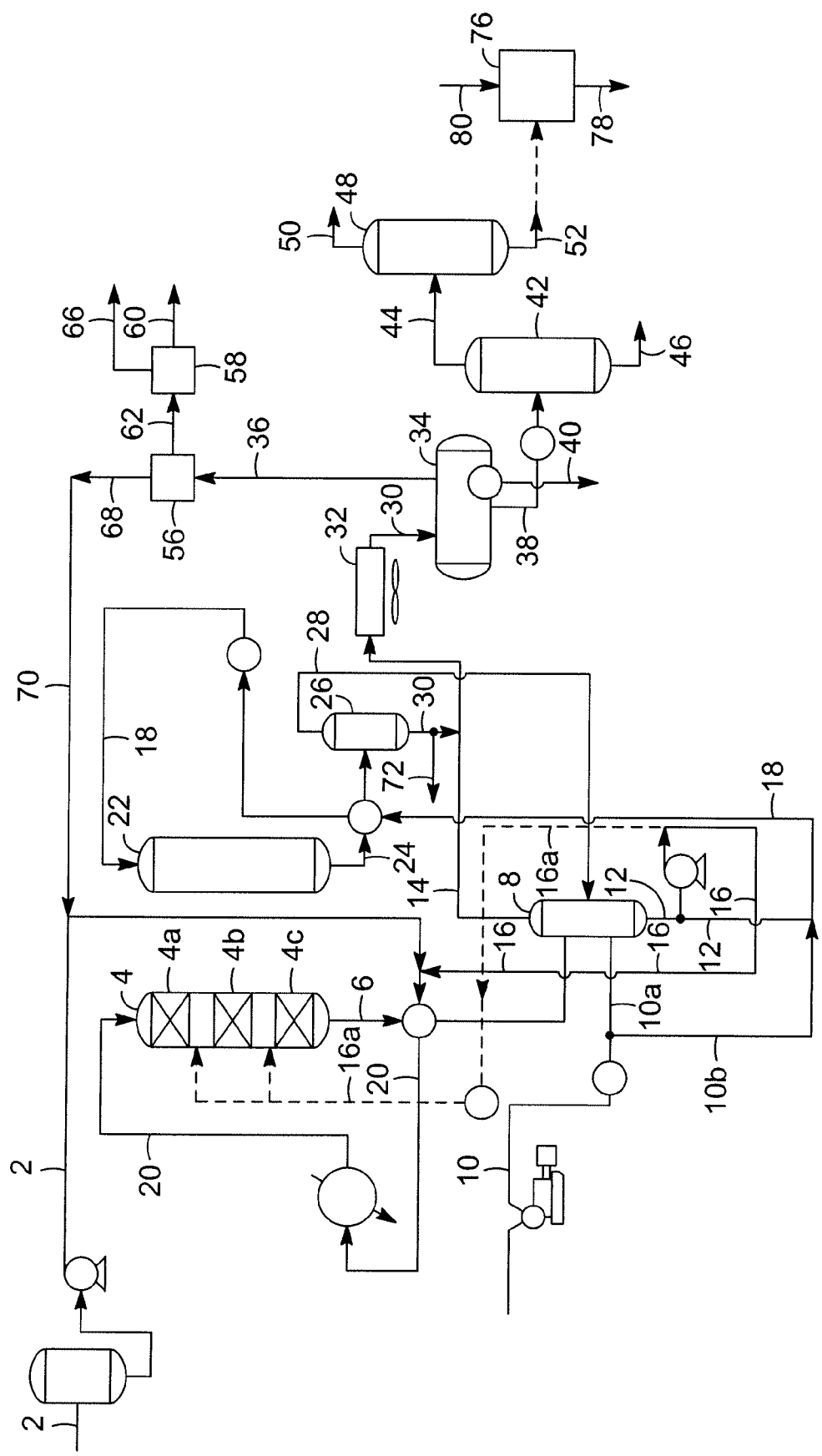

Turning to FIG. 2, the process begins with a renewable feedstock stream 2 which may pass through an optional feed surge drum. The feedstock stream is combined with recycle stream 16 to form combined feed stream 20, which is heat exchanged with reactor effluent and then introduced into deoxygenation reactor 4. The heat exchange may occur before or after the recycle is combined with the feed. Deoxygenation reactor 4 may contain multiple beds shown in FIG. 2 as 4a, 4b and 4c. Deoxygenation reactor 4 contains at least one catalyst capable of catalyzing decarboxylation and/or hydrodeoxygenation of the feedstock to remove oxygen. Deoxygenation reactor effluent stream 6 containing the products of the decarboxylation and/or hydrodeoxygenation reactions is removed from deoxygenation reactor 4 and heat exchanged with stream 20 containing feed to the deoxygenation reactor. Stream 6 comprises a liquid component containing largely normal paraffin hydrocarbons in the diesel boiling range and a gaseous component containing largely hydrogen, vaporous water, carbon monoxide, carbon dioxide and propane.

Deoxygenation reactor effluent stream 6 is directed to hot high pressure hydrogen stripper 8. Make up hydrogen in line 10 is divided into two portions, stream 10a and 10b. Make up hydrogen in stream 10a is also introduced to hot high pressure hydrogen stripper 8. In hot high pressure hydrogen stripper 8, the gaseous component of deoxygenation reactor effluent 6 is stripped from the liquid component of deoxygenation reactor effluent 6 using make-up hydrogen 10a and recycle hydrogen 28. The gaseous component comprising hydrogen, vaporous water, carbon monoxide, carbon dioxide and possibly some propane, is separated into hot high pressure hydrogen stripper overhead stream 14. The remaining liquid component of deoxygenation reactor effluent 6 comprising primarily normal paraffins having a carbon number from about 8 to about 24 with a cetane number of about 60 to about 100 is removed as hot high pressure hydrogen stripper bottom 12.

A portion of hot high pressure hydrogen stripper bottoms forms recycle stream 16 and is combined with renewable feedstock stream 2 to create combined feed 20. Another portion of recycle stream 16, optional stream 16a, may be routed directly to deoxygenation reactor 4 and introduced at interstage locations such as between beds 4a and 4b and/or between beds 4b and 4c in order, or example, to aid in temperature control. The remainder of hot high pressure hydrogen stripper bottoms in stream 12 is combined with hydrogen stream 10b to form combined stream 18 which is routed to isomerization reactor 22. Stream 18 may be heat exchanged with isomerization reactor effluent 24.

The product of the isomerization reactor containing a gaseous portion of hydrogen and propane and a branched-paraffin-rich liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44 with the remainder, the diesel boiling range components, being withdrawn from product stripper 42 in line 46. Stream 44 is introduced into fractionator 48 which operates to separate LPG into overhead 50 leaving a naphtha bottoms 52. Naphtha in stream 52 is passed to an alcohol denaturing unit 76 of an alcohol processing operation. At least a portion of naphtha bottoms 52 is used as the alcohol denaturing agent in denaturing unit 76. The denatured alcohol is removed from denaturing unit 76 in line 78. The denatured alcohol may be used as a component in a subsequent product. Excess naphtha may be removed from denaturing unit 76 (not shown).

The vapor stream 36 from product separator 34 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through a system of at least two amine absorbers, also called scrubbers, starting with the first amine absorber zone 56. The amine chosen to be employed in first amine scrubber 56 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 68 to be recycled to the first reaction zone. The amine is regenerated and the carbon dioxide and hydrogen sulfide are released and removed in line 62. Within the first amine absorber zone, regenerated amine may be recycled for use again. The released carbon dioxide and hydrogen sulfide in line 62 are passed through second amine scrubber zone 58 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS101, HS 102, HS103, HS 104, HS115. Therefore the carbon dioxide passes through second amine scrubber zone 58 and into line 66. The amine may be regenerated which releases the hydrogen sulfide into line 60. Regenerated amine is then reused.

Other separation systems are possible, such as adsorbents and treating processes. However, the amine absorber zone system of FIG. 2 has several advantages with cost being a primary advantage. Amine absorber systems are less costly than molecular sieve adsorbents or treating processes. Vapor stream 36 has a total volume that is much greater than the combined volume of carbon dioxide and hydrogen sulfide. Typically, the amount of hydrogen sulfide in vapor stream 36 ranges from about 1 to about 5 mass-%. In the configuration shown in FIG. 2, the first amine absorber zone 56 is sized to accommodate the flow of the entire vapor stream 36. However, the second amine absorber zone 58 is greatly reduced in size as compared to the first since the flow of material to the second amine absorber zone is only a fraction of vapor stream 36. The reduction in the size of the second amine absorber zone allows for reduced capital and operating costs.

The invention claimed is:

1. An integrated process for producing a paraffin-rich diesel boiling range product from a renewable feedstock and for denaturing an alcohol comprising:
   a) treating the renewable feedstock in a first reaction zone by hydrogenating and deoxygenating the feedstock using a catalyst at reaction conditions in the presence of hydrogen to provide a first reaction zone product stream comprising hydrogen, carbon dioxide, and paraffins having from about 8 to about 24 carbon atoms;
   b) separating the first reaction zone product stream to form:
      i) a stream comprising hydrogen and carbon dioxide;
      ii) a stream comprising the paraffins; and
      iii) a water stream
   c) separating the stream comprising paraffins into a diesel product stream and a naphtha and LPG stream;
   d) separating the naphtha and LPG stream into a naphtha stream and an LPG stream; and
   e) passing the naphtha stream to an alcohol denaturing process and using at least a portion of the naphtha stream as a denaturant.

2. The process of claim 1 wherein the alcohol is ethanol.

3. The process of claim 1 wherein the alcohol denaturing process comprises mixing the alcohol with the denaturant.

4. The process of claim 1 further comprising recycling a portion of the stream comprising paraffins to the first reaction zone at a volume ratio of recycle to feedstock in the range of about 2:1 to about 8:1.

5. The process of claim 1 wherein the reaction conditions in the first reaction zone include a temperature of about 40° C. to about 400° C. and a pressure of about 689 kPa absolute (100 psia) to about 13,790 kPa absolute (2000 psia).

6. The process of claim 1 further comprising pre-treating the feedstock in a pretreatment zone at pretreatment conditions to remove at least a portion of contaminants in the feedstock.

7. The process of claim 1 where the deoxygenating comprises at least one of decarboxylation, decarbonylation, and hydrodeoxygenation.

8. The process of claim 1 further comprising separating carbon dioxide from the stream comprising hydrogen and carbon dioxide and recycling the remaining hydrogen to the first reaction zone.

9. The process of claim 1 further comprising treating a petroleum derived hydrocarbon in the first reaction zone with the renewable feedstock.

10. The process of claim 1 wherein the treating of the feedstock in the first reaction zone is additionally in the presence of at least one sulfur-containing component and the process further comprising separating the carbon dioxide and the sulfur-component from the stream comprising hydrogen and carbon dioxide and recycling the remaining hydrogen to the first reaction zone.

11. An integrated process for producing a branched paraffin-rich diesel product from a renewable feedstock and for denaturing an alcohol comprising;
   a) treating the feedstock in a first reaction zone by hydrogenating and deoxygenating the feedstock using a catalyst at reaction conditions in the presence of hydrogen to provide a first reaction zone product stream comprising hydrogen, water, carbon dioxide, and n-paraffins having from about 8 to about 24 carbon atoms;
   b) separating, in a hot high pressure hydrogen stripper, a gaseous stream comprising hydrogen and at least a portion of the water and carbon dioxide from the first reaction zone product stream and introducing a remainder stream comprising at least the n-paraffins to a second reaction zone to contact an isomerization catalyst at isomerization conditions to isomerize at least a portion of the n-paraffins and generate a branched paraffin-rich stream;
   c) separating a combination of the branched paraffin-rich stream and the gaseous stream to form
      i) a stream comprising hydrogen and carbon dioxide;
      ii) a stream comprising branched paraffins, LPG, and naphtha; and
      iii) a water stream
   d) separating the stream comprising branched paraffins, LPG, and naphtha into a diesel product stream and a naphtha and LPG stream;
   e) separating the naphtha and LPG stream into a naphtha stream and an LPG stream; and
   f) passing the naphtha stream to an alcohol denaturing process and using at least a portion of the naphtha stream as a denaturant.

12. The process of claim 11 wherein the alcohol is ethanol.

13. The process of claim 11 wherein the alcohol denaturing process comprises mixing the alcohol with the denaturant.

14. The process of claim 11 further comprising removing at least a portion of the hydrogen from the branched paraffin-rich stream.

15. The process of claim 14 further comprising recycling the hydrogen removed from the branched paraffin-rich stream to the hot high pressure hydrogen stripper.

16. The process of claim 11 further comprising recycling at least a portion of the branched paraffin-rich stream to the second reaction zone.

17. The process of claim 11 wherein the isomerization conditions in the second reaction zone include a temperature of about 40° C. to about 400° C. and a pressure of about 689 kPa absolute (100 psia) to about 13,790 kPa absolute (2000 psia).

18. The process of claim 11 wherein the hot high pressure hydrogen stripper is operated at a temperature of about 40° C. to about 300° C. and a pressure of about 689 kPa absolute (100 psia) to about 13,790 kPa absolute (2000 psia).

19. The process of claim 11 wherein the second reaction zone is operated at a pressure at least 345 kPa absolute (50 psia) greater than that of the first reaction zone.

20. The process of claim 11 further comprising treating a petroleum derived hydrocarbon in the first reaction zone with the renewable feedstock.

* * * * *